US007620892B2

(12) United States Patent
Rainero et al.

(10) Patent No.: US 7,620,892 B2
(45) Date of Patent: Nov. 17, 2009

(54) SERVER BASED IMAGE PROCESSING FOR CLIENT DISPLAY OF DOCUMENTS

(75) Inventors: Emil V. Rainero, Penfield, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 183 days.

(21) Appl. No.: 10/901,241

(22) Filed: Jul. 29, 2004

(65) Prior Publication Data

US 2006/0026511 A1    Feb. 2, 2006

(51) Int. Cl.
*G06F 17/00* (2006.01)
*G06K 9/36* (2006.01)

(52) U.S. Cl. .................. 715/273; 715/242; 715/255; 382/232; 382/276; 382/254

(58) Field of Classification Search .............. 715/523, 715/501.1, 530, 526, 528, 234, 236, 242, 715/255, 273, 275; 358/1.15, 1.1, 1.9; 709/246, 709/247, 202, 203; 382/167–169, 232, 233, 382/244, 254–262, 276
See application file for complete search history.

(56) References Cited

U.S. PATENT DOCUMENTS

| | | | | |
|---|---|---|---|---|
| 5,157,740 A * | 10/1992 | Klein et al. ................ 382/271 |
| 5,210,824 A | 5/1993 | Putz et al. |
| 5,450,502 A | 9/1995 | Eschbach et al. |
| 5,581,370 A * | 12/1996 | Fuss et al. ................. 358/447 |
| 5,703,965 A * | 12/1997 | Fu et al. .................... 382/232 |
| 5,872,569 A * | 2/1999 | Salgado et al. ............. 715/764 |
| 5,883,979 A | 3/1999 | Beretta et al. |
| 5,963,201 A | 10/1999 | McGreggor et al. |
| 5,991,445 A | 11/1999 | Kato |
| 6,128,021 A | 10/2000 | Van der Meulen et al. ... 345/428 |
| 6,175,427 B1 * | 1/2001 | Lehmbeck et al. ............ 358/1.9 |
| 6,222,642 B1 * | 4/2001 | Farrell et al. ................ 358/1.9 |
| 6,240,215 B1 * | 5/2001 | Salgado et al. .............. 382/254 |
| 6,314,452 B1 | 11/2001 | Dekel et al. ................. 709/203 |
| 6,345,128 B1 | 2/2002 | Stokes |
| 6,449,639 B1 | 9/2002 | Blumberg ................... 709/217 |
| 6,456,340 B1 * | 9/2002 | Margulis .................... 348/745 |
| 6,469,805 B1 * | 10/2002 | Behlok ....................... 358/1.9 |
| 6,484,631 B2 * | 11/2002 | Degani et al. ................ 101/171 |
| 6,501,472 B1 * | 12/2002 | Hunt et al. .................. 345/428 |

(Continued)

FOREIGN PATENT DOCUMENTS

GB    2 343 807 A    5/2000

(Continued)

OTHER PUBLICATIONS

S. Deshpande et al.; "HTTP Streaming of JPEG2000 Images;" Sharp Laboratories of America; Camas, WA 98607; 2001 IEEE; pp. 15-19.

(Continued)

*Primary Examiner*—Adam L Basehoar
(74) *Attorney, Agent, or Firm*—Oliff & Berridge, PLC (57) ABSTRACT

Methods and systems that allow the viewing of arbitrary documents on a client display by up-loading all necessary image processing steps to the server, thereby eliminating any software downloads to, or installation on, the client device.

18 Claims, 4 Drawing Sheets

U.S. PATENT DOCUMENTS

| | | |
|---|---|---|
| 6,538,661 B1 * | 3/2003 | Farnung et al. ............. 345/594 |
| 6,539,547 B2 | 3/2003 | Driscoll, Jr. et al. ............ 725/91 |
| 6,594,687 B1 * | 7/2003 | Yap et al. .................... 709/203 |
| 6,606,418 B2 * | 8/2003 | Mitchell et al. ............. 382/251 |
| 6,618,171 B1 * | 9/2003 | Tse et al. .................... 358/446 |
| 6,628,843 B1 * | 9/2003 | Eschbach et al. ............ 382/274 |
| 6,708,309 B1 | 3/2004 | Blumberg ................... 715/530 |
| 6,744,927 B1 | 6/2004 | Kato |
| 6,754,231 B1 | 6/2004 | Jonsson et al. |
| 6,826,310 B2 | 11/2004 | Trifonov et al. |
| 6,874,131 B2 * | 3/2005 | Blumberg ................... 715/513 |
| 6,944,357 B2 | 9/2005 | Bossut et al. |
| 6,963,668 B2 | 11/2005 | Engeldrum et al. |
| 6,970,602 B1 | 11/2005 | Smith et al. |
| 6,983,083 B2 | 1/2006 | Fedorovskaya et al. |
| 7,031,534 B2 * | 4/2006 | Buckley .................... 382/240 |
| 7,065,255 B2 * | 6/2006 | Chen et al. ................. 382/260 |
| 7,218,789 B2 * | 5/2007 | Faber et al. ................. 382/244 |
| 2001/0035979 A1 | 11/2001 | Pornbacher ................. 358/400 |
| 2002/0056010 A1 * | 5/2002 | Lincoln et al. ............. 709/247 |
| 2002/0085233 A1 * | 7/2002 | Degani et al. ............. 358/3.06 |
| 2002/0087728 A1 | 7/2002 | Deshpande et al. |
| 2002/0107988 A1 * | 8/2002 | Jordan ........................ 709/247 |
| 2002/0112114 A1 * | 8/2002 | Blair et al. .................. 711/100 |
| 2003/0018818 A1 * | 1/2003 | Boliek et al. ................ 709/247 |
| 2003/0053690 A1 | 3/2003 | Trifonov et al. |
| 2003/0135649 A1 | 7/2003 | Buckley et al. |
| 2004/0045030 A1 * | 3/2004 | Reynolds et al. ............ 725/110 |
| 2004/0146206 A1 * | 7/2004 | Matsubara ................... 382/232 |
| 2005/0125352 A1 * | 6/2005 | Hirst ............................ 705/50 |
| 2005/0188112 A1 * | 8/2005 | Desai et al. ................. 709/247 |
| 2005/0244060 A1 * | 11/2005 | Nagarajan et al. ........... 382/232 |
| 2005/0271283 A1 * | 12/2005 | Dekel et al. ................. 382/232 |

FOREIGN PATENT DOCUMENTS

| | | |
|---|---|---|
| WO | WO 00/24188 | 4/2000 |
| WO | WO 00/72517 A1 | 11/2000 |
| WO | WO 00/75859 A1 | 12/2000 |
| WO | WO 00/77741 A1 | 12/2000 |
| WO | WO 01/54397 A2 | 7/2001 |
| WO | WO 01/63558 A2 | 8/2001 |

OTHER PUBLICATIONS

A. Pulsifer; "Advanced Imaging JPEG 2000 has Arrived;" Advanced Imaging; May 2001; 4 pages.

Steve Putz, "Design and Implementation of the System 33 Document Service", Xerox Corporation.

U.S. Appl. No. 10/901,333, filed Jul. 29, 2004; Eschbach et al.

U.S. Appl. No. 10/901,240, filed Jul. 29, 2004; Eschbach et al.

* cited by examiner

SERVER BASED IMAGE PROCESSING FOR CLIENT DISPLAY OF DOCUMENTS

BACKGROUND OF THE INVENTION

1. Field of Invention

This invention relates to server based image processing as a function of the image viewing client device.

2. Description of Related Art

A user typically likes to view a document on a handheld wireless client device before deciding to print, facsimile or e-mail the document. More and more client devices ("clients") allow the display of small images on the client display. Well known example clients are cell phones having color display capability, but also other small form factor display clients are available, such as, for example personal digital assistants (PDAs), e.g., BLACKBERRY RIM™, copier user interfaces, and the like. Common display approaches for these client devices is the use of client software to enable viewing of images, such as, for example, JPEG2000 decoder. A handheld wireless device, such as, for example, a PDA, a cell phone or a miniaturized computing device, has relatively little screen surface area for viewing documents, as well as little memory for storing the document or the applications for all the document formats a user can conceivably access and view.

Current solutions either restrict the document types that can be viewed on handheld client devices, e.g., web pages with graphics interchange format (GIF) files, show only the ASCII text of the document, provide viewers for a small set of document types, or do not provide viewers at all. Increasing the number of viewable documents by adding client side viewers quickly runs into resource problems. In addition, transmitting large application files makes the system impractical considering transfer times and costs.

In client-server situations, a large amount of the actual processing work is generally decentralized from the server and provided to the client in order to reduce server load. For mobile or other small clients, this approach includes several disadvantages. One disadvantage is that the computational capacity on the client side is rather small. Another disadvantage is that, given the vast number of client types in use, performing software updates, software downloads and the like are difficult or impractical.

These disadvantages can be understood considering a simple example. When viewing documents, such as issued patents, Adobe® PDF is a common format, yet, client side viewers have to be installed in order to be able to view the documents. Additionally, a PDF is transmitted in its entirety to the client in order to view the document, often exceeding 1 MB for many patent documents. If no client software is installed, the documents can not be viewed. However, installing viewers for all potential application will, in general, exceed the client capability and transferring entire application files when only pieces need to be viewed will in general exceed reasonable transfer times and costs.

SUMMARY OF THE INVENTION

This invention provides systems and methods that allow the viewing of arbitrary documents on a client display by up-loading all necessary image processing steps to the server, thereby eliminating any software downloads to, or installation on, the client device. One advantage of the exemplary systems and methods of this invention is the relative ease of upgrading the software, since only server upgrades are needed, and the ability to offer new capabilities to existing clients. Another advantage is that web browsers are in one form or another natively residing on common clients. These browsers, or browser-like applications support a limited set of data, like GIF or JPG data. This invention provides systems and methods that provide for a large selection of applications and application files to be viewable using server side processing connected to client side image browsing. In the following discussion, the term browser will be used to indicate any client side image viewing software used in the context of this invention.

In various exemplary embodiments, the systems and methods according to this invention provide for arbitrary documents to be viewed on a client device display by using a server based image processing approach that first converts the document to a standard image format that is supported by the client, and then transmitting the processed document information, or parts thereof, under client request, to the client device.

This invention further provides systems and methods that convert, through server software, dissimilar document types into a document type that is supported by the client based browser, thus enabling use of the browser as the main navigation tool through the server processed document.

This invention further provides methods and systems that provide server based document processing that is a function of at least one or more of a client device parameter, data transmission capability, document type and/or format, and user input.

This invention also provides methods and systems that enable mobile client devices to browse, retrieve, view and print image views of documents in the server based processing environment.

In various exemplary embodiments, this invention provides methods and systems that actively or dynamically perform server based processing of a document in the server as a function of knowledge obtained from the current user's session to optimally render the document.

In various exemplary embodiments, this invention provides methods and systems that dynamically control and/or direct server based document image processing based on knowledge regarding client device hardware and/or software capabilities, browser image formats supported by the client device, network bandwidth, document file format, document content, user hints and the like.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIG. 1 illustrates an exemplary embodiment of a system topology that the systems and methods of this invention are usable with;

DETAILED DESCRIPTION OF PREFERRED EMBODIMENTS

Various exemplary embodiments of systems and methods according to this invention provide for arbitrary documents to be viewed on a client device display by using a server based image processing approach that first converts the document to a standard image format that is supported by the client, and then transmitting the processed document information, or parts thereof, under client request, to the client device.

In various exemplary embodiments, the systems and methods of this invention provide for all document types requested by a client device to be converted through server software into a type that is supported by the client based browser, thus enabling the browser to be used as the main navigation tool through the processed document.

Figure 1:
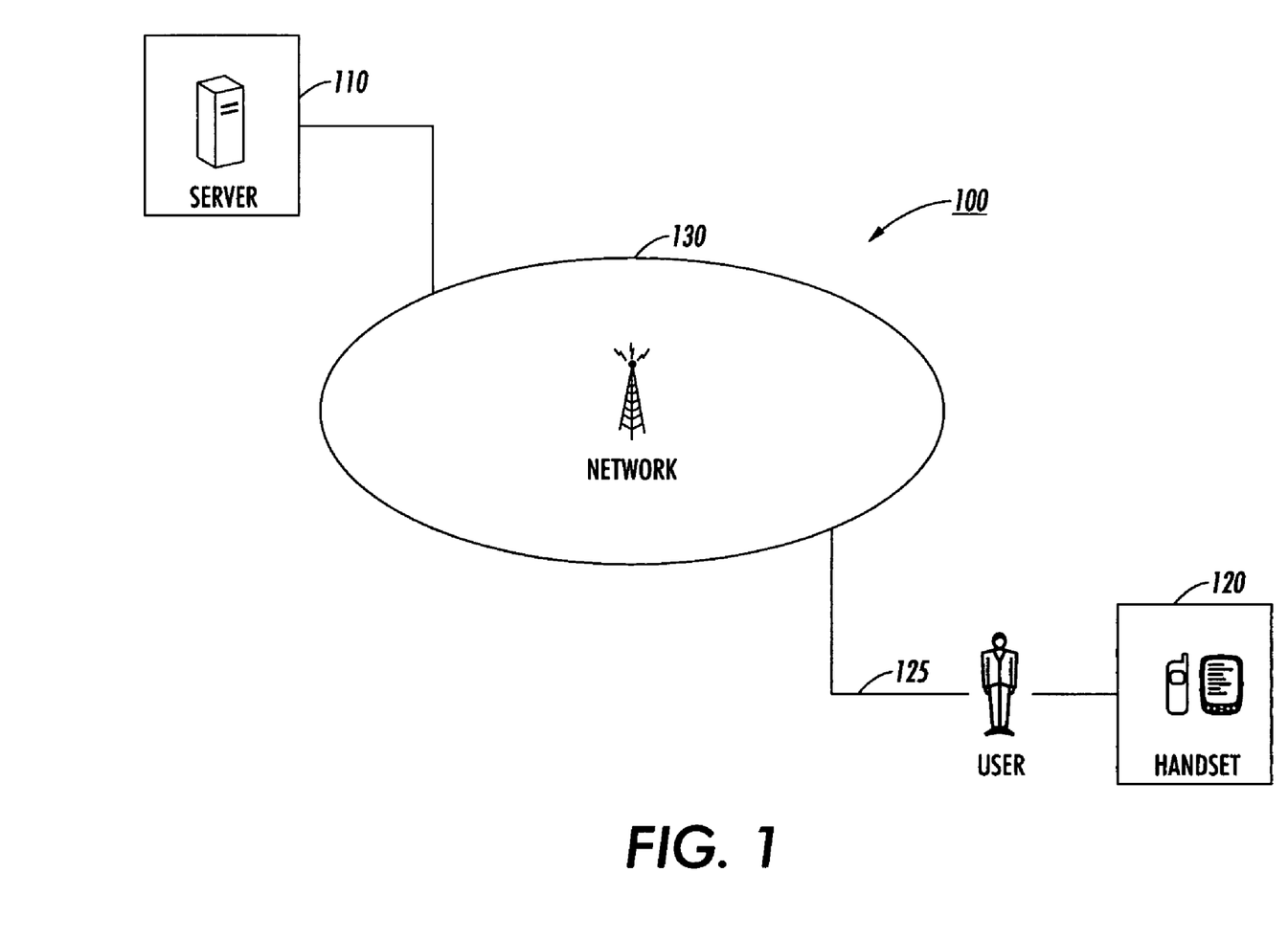

FIG. 1 shows one exemplary embodiment of a system topology 100 associated with the server based image processing according to this invention. As shown in FIG. 1, the system 100 includes one or more servers 110 connected to one or more clients 120 via one or more networks 130.

The server 110 processes image data of a document based on knowledge regarding client device hardware and/or software capabilities, browser image formats supported by the client device, network bandwidth, document file format, document content, user hints and the like. The server 110 then compresses the processed data, and transmits the compressed data to the client 120 by way of the network 130.

In various exemplary embodiments, the server 110 receives requests from the client 120 for a particular document. The server 120 processes the requested document, converting it to image data that is understood by the client, and transmitting processed image data back to the client 120. In various exemplary embodiments, the server 110 creates the image data based on the selection of parameters detected from the client 120, the network 130, or a combination thereof. In various other exemplary embodiments, the server 110 creates the image data based on a selection of parameters prestored at the server 110 regarding the capabilities or requirements of the client 120 and the network 130.

In various exemplary embodiments, the server 110 processes the image data based on client device/handset display hardware and/or software capabilities, image formats supported by the client device/handset, network bandwidth, document file format, document content, user hints and the like. In various other exemplary embodiments, the server 110 receives the selection of parameters sent from the client 120, based on various user inputs.

As part of the server based image processing operations, the server 110 also compresses the processed image data before transmitting the image data to client 120. In various exemplary embodiments, the server 110 compresses the processed image data using tonal reproduction curves (TRC) and/or custom color maps, as described in detail in U.S. patent application Ser. No. 10/901,333, now U.S. Pat. No. 7,539,341, entitled "Systems and Methods For Processing Image Data Prior To Compression" and U.S. patent application Ser. No. 10/901,240, entitled "Client Dependent Image Processing For Browser-Based Image Document Viewer for Handheld Client Devices", both applications being incorporated herein by reference in their entirety.

The server 110 is generally associated with a computer, as described in greater detail below in connection with FIG. 4. The client 120 is a device that can display a form of the processed and compressed image data. The client 120 receives the processed and compressed image data from the server 110 via the network 130. In various exemplary embodiments, the client 120 sends a request for the image data to the server 110 before receiving the processed and compressed data. In various exemplary embodiments, the client 120 selects and sends one or more parameters to the server 110 as a condition for the server 110 to process the data before processing the data.

In various exemplary embodiments, the client 120 is a mobile device, such as a laptop computer, a personal data assistant (PDA), a cellular phone, an electronic computing graphics tablet-like device, a handheld computing device and the like.

The network 130 transmits data, requests or other information between the server 110 and the client 120. In various exemplary embodiments, the network 130 is a wired network. In various other exemplary embodiments, the network 130 is a wireless network. In various other exemplary embodiments, the network 130 includes both wired and wireless networks. In various exemplary embodiments, the network 130 includes the Internet. A user may view processed data on a web browser on the client 120. In various other exemplary embodiments, the network 130 includes a wireless cellular phone network or any other existing or yet to be invented communication network. A user may view the processed data displayed on a cellular phone at the client 120.

It will be noted that the following discussion does not discuss in detail all the server-based image processing operations that may be performed, or that are possible, according to various exemplary embodiments of systems and methods of this invention. Some of the image processing operations/effects that are discussed below are well known in the art and are relatively straight forward. Thus, these image processing operations/effects are not discussed in detail below. For example, if the client only supports GIF image formats, only those files will be created. Other image processing operations/effects, such as, for example, crop windows, image orientation, and the like, may also be practiced according to various exemplary embodiments of the systems and methods of this invention.

Figure 2:
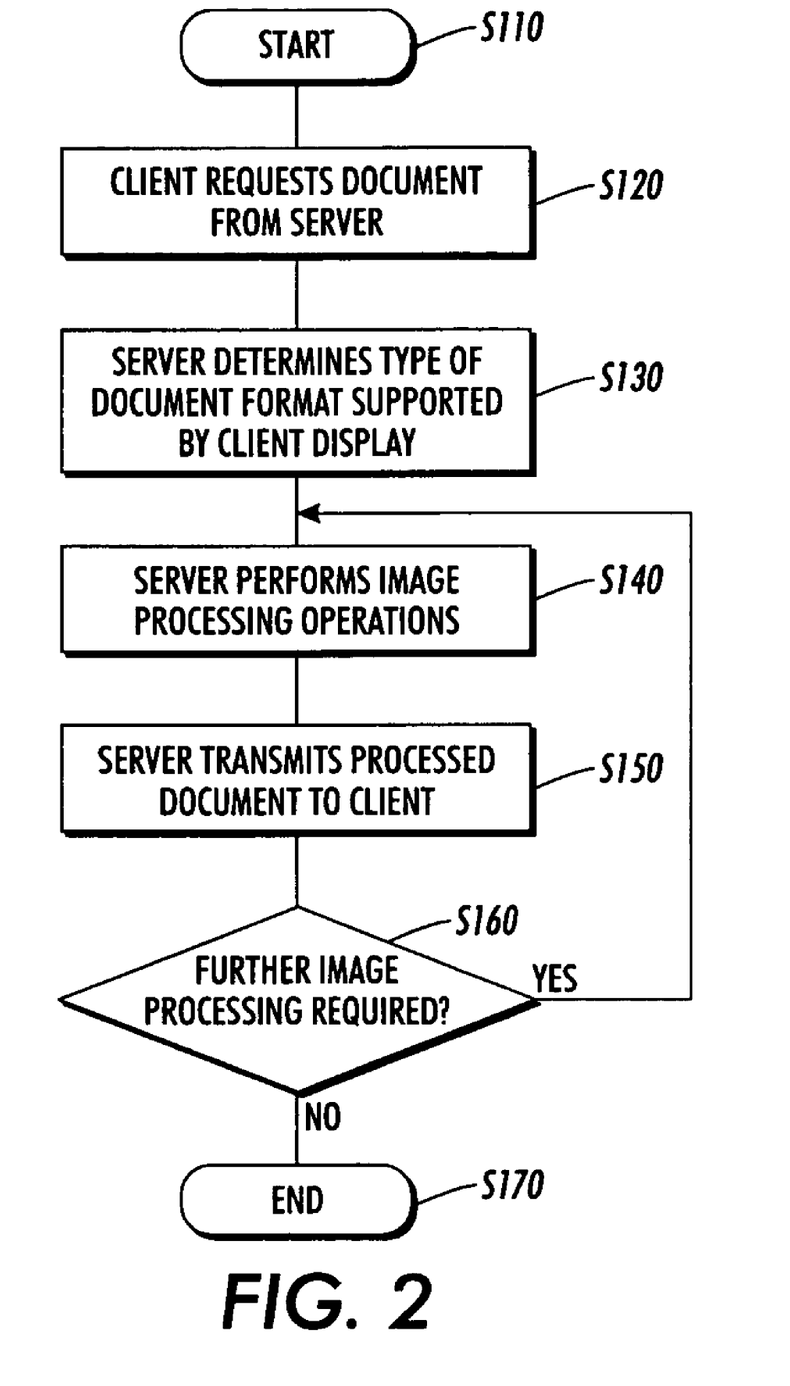
FIG. 2 is a flowchart outlining one exemplary embodiment of a method of server based processing of a document according to this invention.

FIG. 2 is a flowchart outlining one exemplary embodiment of a method for server based processing of a document requested by a client according to this invention. It will be noted that the server based image processing will lead to a different image processing of the same page/document if viewed by two different client devices with different capabilities or attributes. It should also be noted that two different documents will undergo different image processing even for the identical client based on document attributes. That is, not all the steps of the exemplary server based image processing method shown in FIG. 2 may be performed for every document being processed.

As shown in FIG. 2, beginning in step S110, operation of the method continues to step S120, where a server receives a request for a document from a client via a network. In various exemplary embodiments, the server may receive the request to provide a rendition of at least a part of the document image information in a browser application of the client device. In various exemplary embodiments, the request is a signal generated when a user clicks an icon/link displayed at the client. The icon/link represents document data to be processed.

In step S130, the server determines the type of document format that is supported by the client display. Next, at step S140, the server performs one or more server based image processing operations of the requested document image information based on the document format determined. In various exemplary embodiments, performing one or more server based image processing operations may include determining one or more parameters associated with at least one of the client device, a data network to transmit the at least a part of the document image information to the browser of the client device, a requested document file format and user-provided hints. In various exemplary embodiments, determining the one or more parameters may be performed dynamically, without operator intervention.

In various exemplary embodiments, the one or more server based image processing operations may include processing of the image information based on one or more of at least a client device make or model, client device input capabilities (pen or roller), client device display capabilities (X by Y pixels, pixels per inch in X and Y, color depth, color model), type of image formats supported by the client device browser application (file formats, compression, progressive/interlaced), client device browser capabilities (tables, image maps), an image data display zoom level requested by the client device, a bandwidth of the data transmission network, a transmission speed of the network and a type and/or content of document requested by the client device and user-provided hints for displaying the image data. Further, processing image information may also based on knowledge obtained from a current user's session.

Following the processing of the document data, at step S150, the server based processed data is transmitted to the client device for display on the client device, for example on the client device browser. The user has the ability to navigate the document, for example, page selection, pan, zoom, rotate, as well as the ability to provide for image quality requests, e.g., request a service schematic, medical x-ray, insurance claim, real estate listing, sharpen the image, black/white or color image requests, invert image, color correct, and the like, using the browser.

At step S160, a determination is made whether additional server based image processing operations are required. If it is determined that additional server based image processing operations are not required, operation of the method continues to step S170, where the operation stops. It should be noted that based on server load, user preferences or system settings, additional processing might be initiated on the server anticipating a new user request. If that data is subsequently requested by the user, a faster response time is achieved. If the data is not requested it discarded or held as temporary data for some amount of time until it is requested or discarded.

If, however, it is determined that additional server based image processing operations are required, operation of the method returns to step S140 for further server based image processing. For example, if a different view setting is required, e.g., a different zoom or location within the document, the user, through the client device, will generate a new request. The client device will transmit the user request to the server. The server then prepares a new image according to the client request, and transmits the new image to the client device. The operation is repeated as desired by at least the user.

Figure 3:
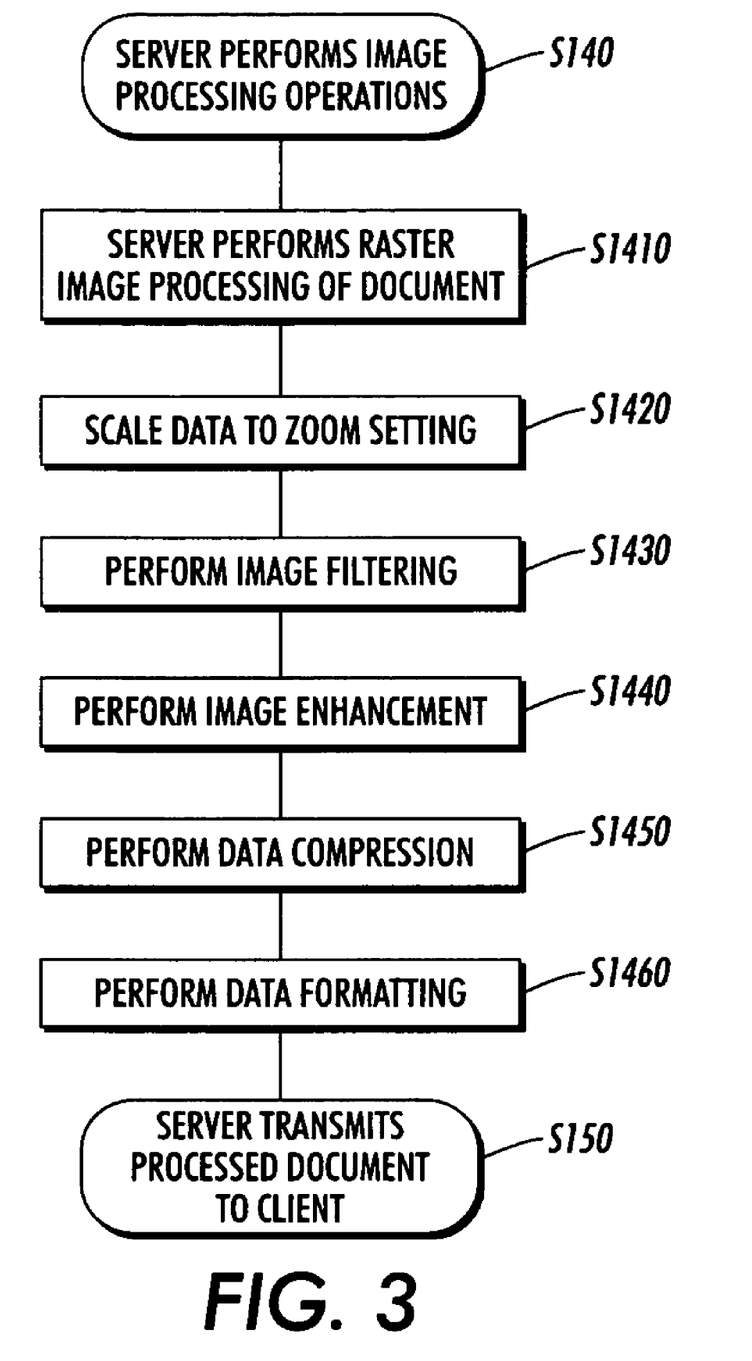
FIG. 3 is a flowchart outlining in greater detail one exemplary embodiment of various client dependent processing operations performed by the server according to the method of FIG. 2.

FIG. 3 is a flowchart outlining in greater detail one exemplary embodiment of various server based image processing operations performed at step S140 by the server according to the method of FIG. 2. In various exemplary embodiments, the server based image processing operations include the steps of running the document application in order to create a data file that can be 'RIPped' into an image raster. All raster operations are then performed, such as, for example, rotation, scaling, cropping, enhancement, and the document image data is transformed into a client native format. For standard browser applications, this is either GIF, JPG or WBMP (WAP) format in the suitable size.

As shown in FIG. 3, the server based image processing operations begin at step S140 and continue to step S1410 where the requested document is converted to a raster image on the server using well known raster image processing (RIP) techniques. This raster image generally uses some client capabilities, such as, for example, black and white rendering for a black and white device, and some document attributes, for example, lower initial resolution for PowerPoint documents compared to Word documents. The use of document attributes can be understood when considering the likelihood that certain document types will have certain properties. Presentation slides, for example, will have larger fonts and thus generally require a lower initial RIP resolution than legal documents.

Next, at step S1420, the 'RIPed' data is subsequently scaled to the desired zoom settings. For example, in various exemplary embodiments, the data may be scaled to one of the current prototype mDoc version 4 zoom settings, e.g., 2, 4, 8 and 16 reduction, using a density preserving reduction (filter & down sampling) leading to 5 raw images at the 5 different resolutions. The raw images may not yet adhere to the client color and bit-depth requirements.

Following data scaling, operation of the method continues to step S1430 where image filtering is performed. At high reduction levels, the page content can only be "guessed" by the user. Twelve point text, for example, would be rendered at single pixel height for most letters. In various exemplary embodiments of the methods and systems according to this invention, the image sharpness is strongly increased for higher reduction factors, well above any limit that would be used for normal image viewing. However, increasing the sharpness at high reduction factors gives the user the perception of "text" without making the text readable. For the exemplary prototype mDoc application, speed is an important consideration as it directly influences user latency. As a speed/quality compromise, in one exemplary embodiment, a 5 element filter was chosen where four ring values are constant ("−1") and the center value is varied. Smaller center values yield stronger enhancement. Other techniques known in the art or later developed may also be used to perform image filtering operations.

After image sharpening, at step S1440, enhancement TRCs are used to further increase the contrast of the data. The TRCs are a function of reduction factors (stronger enhancement for higher reductions) and of document applications. In this case, presentation slides and scanned data undergoes an essential symmetric contrast enhancement. Text documents and spreadsheets undergo a non-symmetric enhancement leading to a strong visual darkening. This is based on the likelihood that different color and foreground/background schemes are used in the different document types.

At step S1450, a data compression operation is performed. As part of the data compression operation, data compression parameters may be varied based on transmission bandwidth and client storage capabilities, as well as other factors. In the binary case, no variation can be obtained at this step directly, but rather a different enhancement can be performed. For color clients, a choice exists between JPEG and GIF compressions, since both are normally supported in the browser. In JPEG compression, only the Q-table can be used to change compression ratios, where a changing Q-factor in essence represents a scaled and thus different Q-Table. For the "GIF compression" (better in the GIF format encapsulated compression method), the compression efficiency may be modified by the initial color mapping. For the discussion presented below, a dynamic color mapping between "222" (8 colors) and "794" (252 colors) is assumed, as described in detail in U.S. patent application entitled "Systems and Methods For Processing Image Data Prior To Compression," which is incorporated herein by reference in its entirety.

Following data compression, the method continues to step S1460 where a data formatting operation is performed. Following formatting of the data, the processed document/image is transmitted to the client device, step S150.

Table 1 is an exemplary embodiment of an image processing table showing the different image processing aspects as a function of reduction (zoom setting) and application. In Table 1, TRC name 64L indicates a TRC that is non-symmetric ("L"eft) and that maps all pixel values below 64 to "black". A TRC name 32 indicates a symmetric TRC that maps all values below 32 to black and all values above 223 to white. The rest of the range is a linear mapping between black and white. The term "reduce" refers to a filtered subsampling, preferably maintaining image density attributes.

TABLE 1

|  | Word processor | | Spreadsheet | | Presentation | | Scan | |
| --- | --- | --- | --- | --- | --- | --- | --- | --- |
| RIP Resolution | 150 | | 150 | | 75 | | — | |
| Scale Method | Reduce | | Reduce | | Reduce | | Reduce | |
| Zoom level | 1, 2, 3, 4 | | 1, 2, 3, 4 | | 1, 2, 3 | | 1, 2, 3, 4 | |
| Enhance Method | TRC stretching | | TRC stretching | | TRC stretching | | TRC stretching | |
| Enhance TRC For different scale factors between: | 1 | NO | 1 | NO | 1 | NO | 1 | 32 |
|  | 2 | 32L | 2 | 32L | 2 | 32 | 2 | 50 |
|  | 3 | 64L | 3 | 64L | 3 | 50 | 3 | 64 |
|  | 4 | 100L | 4 | 100L |  |  | 4 | 64 |
| Linear Filter method | 5 Element sharpen | | 5 Element sharpen | | 5 Element sharpen | | 5 Element sharpen | |
| Center Value | 1 | NO | 1 | NO | 1 | NO | 1 | NO |
|  | 2 | 8 | 2 | 8 | 2 | 8 | 2 | 8 |
|  | 3 | 8 | 3 | 8 | 3 | 8 | 3 | 8 |
|  | 4 | 6 | 4 | 6 |  |  | 4 | 6 |

As can be observed from Table 1, different image processing settings are used for different document types and zoom levels. The exemplary values given in Table 1 are currently used in an exemplary mDoc viewer demo produced by the inventors. For binary clients, such as for example, WAP phoned, processing stops at the level of Table 1, with only the file format conversion to WBMP being done after the image processing. For color capable clients, some additional steps, which are well known in the art, may be added.

One advantages of exemplary systems and methods according to this invention is that, even without client based software, arbitrary documents can be viewed in the server based viewing scenario. This approach enables cell phones, PDAs and other small mobile devices to browse document storage locations, to retrieve documents for viewing or printing and to access crucial data from any location in the world.

Figure 4:
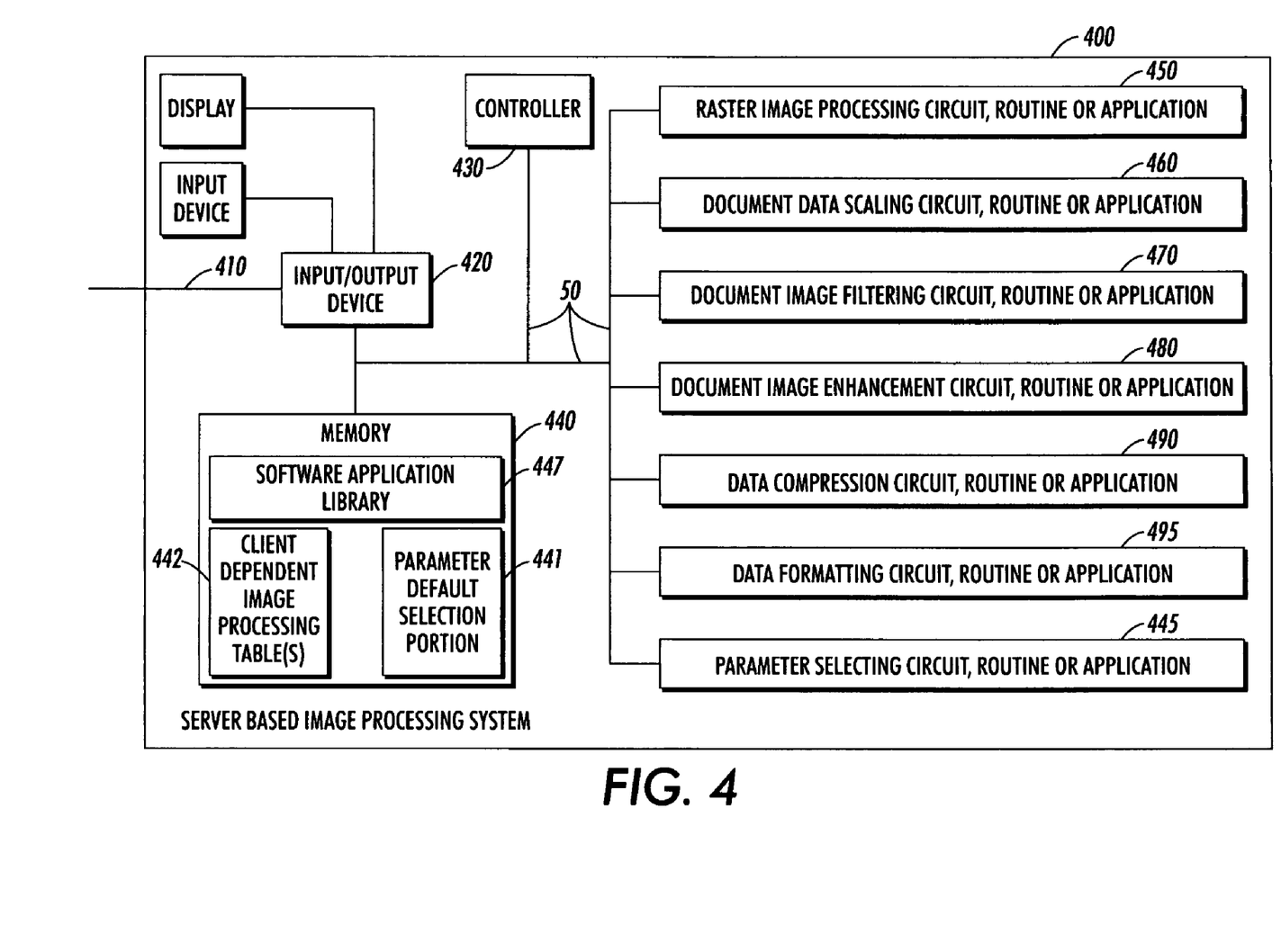
FIG. 4 is a functional block diagram of an exemplary embodiment of a server-based image processing system according to this invention.

FIG. 4 is a functional block diagram of an exemplary embodiment of a server based image processing system 400 according to this invention. As shown in FIG. 4, the server based image processing system 400 may include an input/output (I/O) interface 420, a controller 430, a memory 440, a parameter selecting circuit, routine or application 445, an application library 447, a raster image processing circuit, routine or application 450, a document data scaling circuit, routine or application 460, an image filtering circuit, routine or application 470, an image enhancement circuit, routine or application 480, a data compression circuit, routine or application 490, and a data formatting circuit, routine or application 495, each interconnected by one or more control and/or data buses and/or application programming interfaces 500.

In various exemplary embodiments, the server based image processing system 400 is implemented on a programmable general purpose computer. However, the server based image processing system 400 can also be implemented on a special purpose computer, a programmed microprocessor or microcontroller and peripheral integrated circuit elements, an ASIC or other integrated circuits, a digital signal processor (DSP), a hard wired electronic or logic circuit, such as a discrete element circuit, a programmable logic device such as a PLD, PLA, FPGA or PAL, or the like. In general, any device capable of implementing a finite state machine that is in turn capable of implementing the flowchart shown in FIGS. 2 and 3 can be used to implement the server based image processing system 400.

The input/output interface 420 interacts with the outside of the server based image processing system 400. In various exemplary embodiments, the input/output interface 420 may receive input from the outside, such as a network, via one or more links 410. The input/output interface 420 may output data for subsequent delivery or transmission via the one or more links 410 to a client device (shown in FIG. 2).

The one or more links 410 may be direct connections, or may be implemented using a connection device such as a modem, a local area network, a wide area network, an intranet, the Internet, and any other distributed processing network, or any other known or later-developed connection device.

As shown in FIG. 4, the memory 440 includes a parameter default selection portion 441 and one or more client dependent image processing table(s) 442. The parameter default selection portion 441 stores default selections of parameters for at least the client devices ("clients"). The parameter default selection portion 441 can also store parameters of various networks and display devices. The one or more client dependent image processing table(s) 442 stores different image processing settings that are used for different document types, zoom levels, and the like.

The memory 440 may also store any data and/or program necessary for implementing the functions of the server based image processing system 400. For example, in an exemplary embodiment, the memory 440 may also store the application library 447. As discussed above, as part of server based image processing operations, the application file associated with the document being requested to be viewed by the client device has to be interpreted by the server. Thus, the server based image processing system 400 includes the specific application, or a different application that allows viewing of the application.

The memory 440 can be implemented using any appropriate combination of alterable, volatile, or non-volatile memory or non-alterable or fixed memory. The alterable memory, whether volatile or non-volatile, can be implemented using any one or more of static or dynamic RAM, a floppy disk and a disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

In the exemplary embodiments of the server based image processing system 400 shown in FIG. 4, the parameter selecting circuit, routine or application 445, under the control of controller 430, determines a selection of parameters. In various exemplary embodiments, the parameter selecting circuit, routine or application 445 determines the selection of parameters based on the specific characteristics of the client device, a user's instructions, a default selection stored in the memory 440, and/or detected features of the network, the client and/or the document type. In various exemplary embodiments, a detection may be made by detecting a network and/or device type, coupled with parameters stored for that network/device type. In various exemplary embodiments, different documents are processed differently. For example, a Word™ document is processed differently from a PowerPoint™ document, with the corresponding application files being rendered using appropriate application software from library 447. As discussed above, the various exemplary embodiments of the systems and methods according to this invention do not require a specific application, e.g., Word™, to read Word files. Instead, all that is need is an application that understands the specific file format of the requested document. In various exemplary embodiments, different client devices process the same document differently.

The raster image processing circuit, routine or application 450, under the control of controller 430, converts a document requested by the client to a raster image on the server using well known raster image processing (RIP) techniques.

The document data scaling circuit, routine or application 460, under the control of controller 430, scales the 'RIPed' data to the desired zoom settings. For example, in various exemplary embodiments, the data may be scaled to one of the current prototype mDoc version 4 zoom settings, e.g., 2, 4, 8 and 16 reduction, using a density preserving reduction (filter & down sampling) leading to 5 raw images at the 5 different resolutions.

The image filtering circuit, routine or application 470, under the control of controller 430, performs image filtering of the scaled data. In various exemplary embodiments of the methods and systems according to this invention, the image sharpness is strongly increased for higher reduction factors, well above any limit that would be used for normal image viewing.

The image enhancement circuit, routine or application 480, under the control of controller 430, uses enhancement TRCs to further increase the contrast of the data.

Following image enhancement, the data compression circuit, routine or application 490, under the control of controller 430, compresses the processed data. In various exemplary embodiments, the data compression circuit, routine or application 490 compresses the processed image data using tonal reproduction curves (TRC) to suppress backgrounds and to further enhance the perception of detail, and optionally custom color maps of the enhanced data, as described in detail in U.S. patent application Ser. No. 10/901,333, now U.S. Pat. No. 7,539,341, entitled "Systems and Methods For Processing Image Data Prior To Compression", which is incorporated herein by reference in its entirety.

The data formatting circuit, routine or application 495, under the control of controller 430, finally formats the data prior to transmitting the data over the network to the client device. In various exemplary embodiments, the data formatting circuit, routine or application 495 formats the data based on one or more client dependent image processing table(s) 442. As discussed above, tables 442 store different image processing settings that are used for different document types, zoom levels, and the like.

While particular embodiments have been described, alternatives, modifications, variations and improvements may be implemented within the spirit and scope of the invention.

What is claimed is:

1. A method for processing image information associated with a document requested by a client device from a server, the image information having one or more data values and color levels, the method comprising:

receiving a request to provide the document image information to the client device;

determining, by the server, from a plurality of possible image formats, an image format of the requested document image information that is compatible with a client device display format;

predefining a set of relationships between zoom levels and enhancement tonal reproduction curves in one or more client dependent image processing tables: and performing one or more server based image processing operations of the requested document image information based on the determined image format, wherein the performing one or more server based image processing operations comprises:

converting the requested document to a raster image using raster image processing techniques;

scaling the raster image to a zoom level desired or requested by the client device;

enhancing a contrast of the data values using an enhancement tonal reproduction curve, the enhancement tonal reproduction curve being selected, based on the zoom level, from the predefined set of relationships stored in the one or more client dependent image processing tables; and compressing data of the raster image, wherein the compression is performed after the contrast enhancement, and uses tonal reproduction curves to suppress backgrounds and further enhance perception of detail.

2. The method of claim 1, wherein providing a request comprises:

selecting the document to be viewed by a user; and requesting the server to provide a rendition of at least a part of the document image information in a browser application of the client device.

3. The method of claim 1, wherein performing one or more server based image processing operations comprises determining one or more parameters associated with at least one of the client device, a data network to transmit the at least a part of the document image information to the browser of the client device, a requested document file format and user-provided hints.

4. The method of claim 3, wherein performing one or more server based image processing operations comprises processing image information by reducing a number of the color levels based on the one or more parameters determined.

5. The method of claim 3, wherein determining one or more parameters comprises determining the one or more parameters dynamically, without operator intervention.

6. The method of claim 1, wherein performing one or more server based image processing operations comprises processing image information based on one or more of at least a client device make or model, client device input capabilities, client device display capabilities, type of image formats supported by the client device browser application, client device browser capabilities, an image data display zoom level requested by the client device, a bandwidth of the data transmission network, a transmission speed of the network and a type and/or content of document requested by the client device and user-provided hints for displaying the image data.

7. The method of claim 1, wherein performing one or more server based image processing operations comprises processing image information based on knowledge obtained from a current user's session.

8. The method of claim 2, further comprising transmitting the at least a part of the document image information processed by the server to a browser of the client device for display.

9. The method of claim 1, said compressing step including processing the image data to reduce a number of the color levels.

10. The method of claim 8, further comprising performing additional server based image processing operations of the requested document image information in response to at least one of user-initiated document image information quality requests and document navigation requests performed on the document image information displayed in the browser.

11. The method of claim 10, wherein the user-initiated document image information quality requests comprise at least a contrast sharpening request, a color type selection request, an image invert request and a color correct request.

12. The method of claim 10, wherein the document navigation requests comprise a document image page selection request, a document image panning request, a document image zoom request and/or a document image rotate request.

13. A system to process image information associated with a document requested by a client device from a server, the image information having one or more data values and color levels, the system comprising a controller that:
   receives a request to provide the document image information to the client device;
   determines, using the server, from a plurality of possible image formats, an image format of the requested document image information that is compatible with a client device display format;
   accesses a set of relationships between zoom levels and enhancement tonal reproduction curves that is predefined in one or more client dependent image processing tables; and
   performs one or more server based image processing operations of the requested document image information based on the determined image format, wherein the performing one or more server based image processing operations comprises:
      converting the requested document to a raster image using raster image processing techniques;
      scaling the raster image to a zoom level desired or requested by the client device;
      enhancing a contrast of the data values using an enhancement tonal reproduction curve, the enhancement tonal reproduction curve being selected, based on the zoom level, from the predefined set of relationships stored in the one or more client dependent image processing tables; and
      compressing data of the raster image, wherein the compression is performed after the contrast enhancement, and uses tonal reproduction curves to suppress backgrounds and further enhance perception of detail.

14. The system of claim 13, wherein providing a request comprises:
   selecting the document to be viewed by a user; and
   requesting the server to provide a rendition of at least a part of the document image information in a browser application of the client device.

15. The system of claim 13, wherein performing one or more server based image processing operations comprises determining one or more parameters associated with at least one of the client device, a data network to transmit the at least a part of the document image information to the browser of the client device, a requested document file format and user-provided hints.

16. The system of claim 15, wherein performing one or more server based image processing operations comprises processing image information by reducing a number of the color levels based on the one or more parameters determined.

17. A machine-readable medium that provides instructions for processing image information associated with a document requested by a client device from a server, the image information having one or more data values and color levels, the instructions, when executed by a processor, cause the processor to perform operations comprising:
   receiving a request to provide the document image information to the client device;
   determining, by the server, from a plurality of possible image formats, an image format of the requested document image information that is compatible with a client device display format;
   accessing a set of relationships between zoom levels and enhancement tonal reproduction curves that is predefined in one or more client dependent image processing tables; and
   performing one or more server based image processing operations of the requested document image information based on the determined image format, wherein the performing one or more server based image processing operations comprises:
      converting the requested document to a raster image using raster image processing techniques;
      scaling the raster image to a zoom level desired or requested by the client device;
      enhancing a contrast of the data values using an enhancement tonal reproduction curve, the enhancement tonal reproduction curve being selected, based on the zoom level, from the predefined set of relationships stored in the one or more client dependent image processing tables; and
      compressing data of the raster image, wherein the compression is performed after the contrast enhancement, and uses tonal reproduction curves to suppress backgrounds and further enhance perception of detail.

18. The machine-readable medium of claim 17, wherein performing the one or more server based image processing operations comprises processing image information based on one or more of at least a client device make or model, client device input capabilities, client device display capabilities, type of image formats supported by the client device browser application, client device browser capabilities, an image data display zoom level requested by the client device, a bandwidth of the data transmission network, a transmission speed of the network and a type and/or content of document requested by the client device and user-provided hints for displaying the image data.

* * * * *